US009729832B2

(12) United States Patent
Dawson et al.

(10) Patent No.: US 9,729,832 B2
(45) Date of Patent: Aug. 8, 2017

(54) DEVICE FOR MEASURING THE LENGTH AND DIAMETER OF A CONTAINER USING STRUCTURED LIGHTING, AND METHOD OF USE

(71) Applicant: Envipco Holding N.V., Amersfoort (NL)

(72) Inventors: Donald E. Dawson, Paeonian Springs, VA (US); Elmo Schoensee, Beacon Falls, CT (US); Terje Hanserud, Milford, CT (US)

(73) Assignee: Envipco Holding N.V., Amersfoort (NL)

( * ) Notice: Subject to any disclaimer, the term of this patent is extended or adjusted under 35 U.S.C. 154(b) by 153 days.

(21) Appl. No.: 14/542,173

(22) Filed: Nov. 14, 2014

(65) Prior Publication Data
US 2016/0142678 A1    May 19, 2016

(51) Int. Cl.
*H04N 7/18* (2006.01)
*G01B 11/02* (2006.01)
(Continued)

(52) U.S. Cl.
CPC ............. *H04N 7/18* (2013.01); *G01B 11/028* (2013.01); *G01B 11/08* (2013.01); *G01B 11/25* (2013.01);
(Continued)

(58) Field of Classification Search
None
See application file for complete search history.

(56) References Cited

U.S. PATENT DOCUMENTS 4,625,107 A    11/1986   Planke
4,859,862 A    8/1989    Planke et al.
(Continued)

FOREIGN PATENT DOCUMENTS

DE    196 25 055 A1      4/1997
DE    10 2010 036 762 A1 12/2011
WO    WO 2009158363 A1   12/2009

OTHER PUBLICATIONS

ISR (International Search Report) of Mar. 7, 2016 for International Application No. PCT/US2015/067453 (2 pages).
(Continued)

*Primary Examiner* — Dakshesh Parikh
(74) *Attorney, Agent, or Firm* — Shlesinger Arkwright & Garvey LLP

(57) ABSTRACT

Device for measuring the length and diameter of a container using structured lighting includes a receiving area for receiving a container having a length and width. Receiving area has a surface on which container is received. A first laser line generator is provided and configured for directing a triangular plane of laser light at receiving area and container received in receiving area. A camera provided and configured for detecting an image of a first laser line appearing on surface of container in receiving area, and detecting an image of a second laser line appearing on surface of receiving area. An analyzing device may be provided to receive images of first and second laser lines, and use images of first and second laser lines to determine diameter and length of container received on receiving surface. Analyzing device may determine length and width of container by counting pixels.

16 Claims, 6 Drawing Sheets

(51) Int. Cl.
    *G01B 11/08* (2006.01)
    *G01B 11/25* (2006.01)
    *G06K 9/78* (2006.01)
    *G07F 7/06* (2006.01)
    *H04N 1/00* (2006.01)

(52) U.S. Cl.
    CPC ............... *G06K 9/78* (2013.01); *G07F 7/06* (2013.01); *H04N 1/00334* (2013.01)

(56) References Cited

U.S. PATENT DOCUMENTS

| | | |
|---|---|---|
| 4,996,440 A | 2/1991 | Nordbryhn |
| 5,860,503 A * | 1/1999 | Hanserud ............ G07F 7/0609 194/213 |
| 5,898,169 A | 4/1999 | Nordbryhn |
| 8,729,455 B2 | 5/2014 | Kulki et al. |
| 8,813,938 B2 | 8/2014 | Handschick |
| 8,910,567 B2 | 12/2014 | Moch et al. |
| 2011/0259714 A1 | 10/2011 | Handschick et al. |
| 2012/0017782 A1 | 1/2012 | Moch et al. |
| 2012/0118700 A1 | 5/2012 | Handschick et al. |
| 2012/0260811 A1 | 10/2012 | Schulenberg et al. |
| 2013/0248716 A1 | 9/2013 | Kulcke |
| 2013/0299304 A1 | 11/2013 | Handschick |
| 2014/0048391 A1 | 2/2014 | Beyer |

OTHER PUBLICATIONS

"Structured light" from Wikipedia, the free encyclopedia—Oct. 30, 2014 http://en.wikipedia.org/wiki/Structured_light (2 pgs).

"Technical Guide From Axis Communications" (http://www.axis.com/products/video/about_networkvideo/resolution.htm).

Retrieved from "Waybackmachine" at https://web.archive.org/web/20140722074310/http://www.axis.com/products/video/about_networkvideo/resolution.htm Copyright 2014, retrieved Jul. 22, 2014 (4 pages).

* cited by examiner

DEVICE FOR MEASURING THE LENGTH AND DIAMETER OF A CONTAINER USING STRUCTURED LIGHTING, AND METHOD OF USE

FIELD OF THE INVENTION

The present invention relates to a device for measuring the length and diameter of an object, such as a container, using structured light. More particularly, the invention relates to a device for measuring the length and diameter of a container using structured light by calculations based on pixel counts. Even more particularly, the invention relates to a device for measuring the length and diameter of a container using structured light, suited for use in a reverse vending machine (RVM).

BACKGROUND OF THE INVENTION

U.S. Pat. No. 4,625,107 to Planke describes a method for contour recognition of transparent objects by use of illumination.

U.S. Pat. No. 4,859,862 to Planke et al. describes a device for generating, detecting, and characterizing a raster image of the contour of an object.

U.S. Pat. No. 4,996,440 to Nordbryhn describes a device for measuring regions of an object to determine dimensions of such object, by directing a light beam towards an object, receiving light beams reflected from object, and calculating travel time of beam to and from the object.

U.S. Pat. No. 5,898,169 to Nordbryhn describes a device for generating, detecting, and recognizing a contour image of a liquid container, and a processing means for comparing such with predetermined container feature data to recognize contour image of container.

OBJECTS AND SUMMARY OF THE INVENTION

It is an object of the invention to provide a device for measuring dimensions of a container using structured light.

Another object of the invention is to provide a device for measuring the length and diameter of a container using structured light using a camera and one laser light source. Another object of the invention is to provide a device for measuring the length and diameter of a container using structured light using a camera and two or more laser light sources.

It is another object of the invention to provide a device using structured light for determining length and diameter of a container by counting pixels.

In sum, the invention is directed to a device for measuring the length and diameter of a container using structured lighting which one of comprises, includes, consists of, and consists essentially of a receiving area for receiving a container having a length and width. Receiving area has a surface on which container is received. A first laser line generator is provided and directs a triangular plane of laser light at receiving area and container received in receiving area. A camera is provided and detects an image of a first laser line appearing on surface of container in receiving area, and detects an image of a second laser line appearing on surface of receiving area. An analyzing device may be provided to receive images of first and second laser lines, and use images of first and second laser lines to determine diameter and length of container received on receiving surface. Analyzing device may determine length and width of container by counting pixels.

The term structured lighting, also termed structured light, will be used for convenience.

Relative terms such left, right, up, and down are for convenience only and are not intended to be limiting.

DETAILED DESCRIPTION OF THE INVENTION

Figure 1:
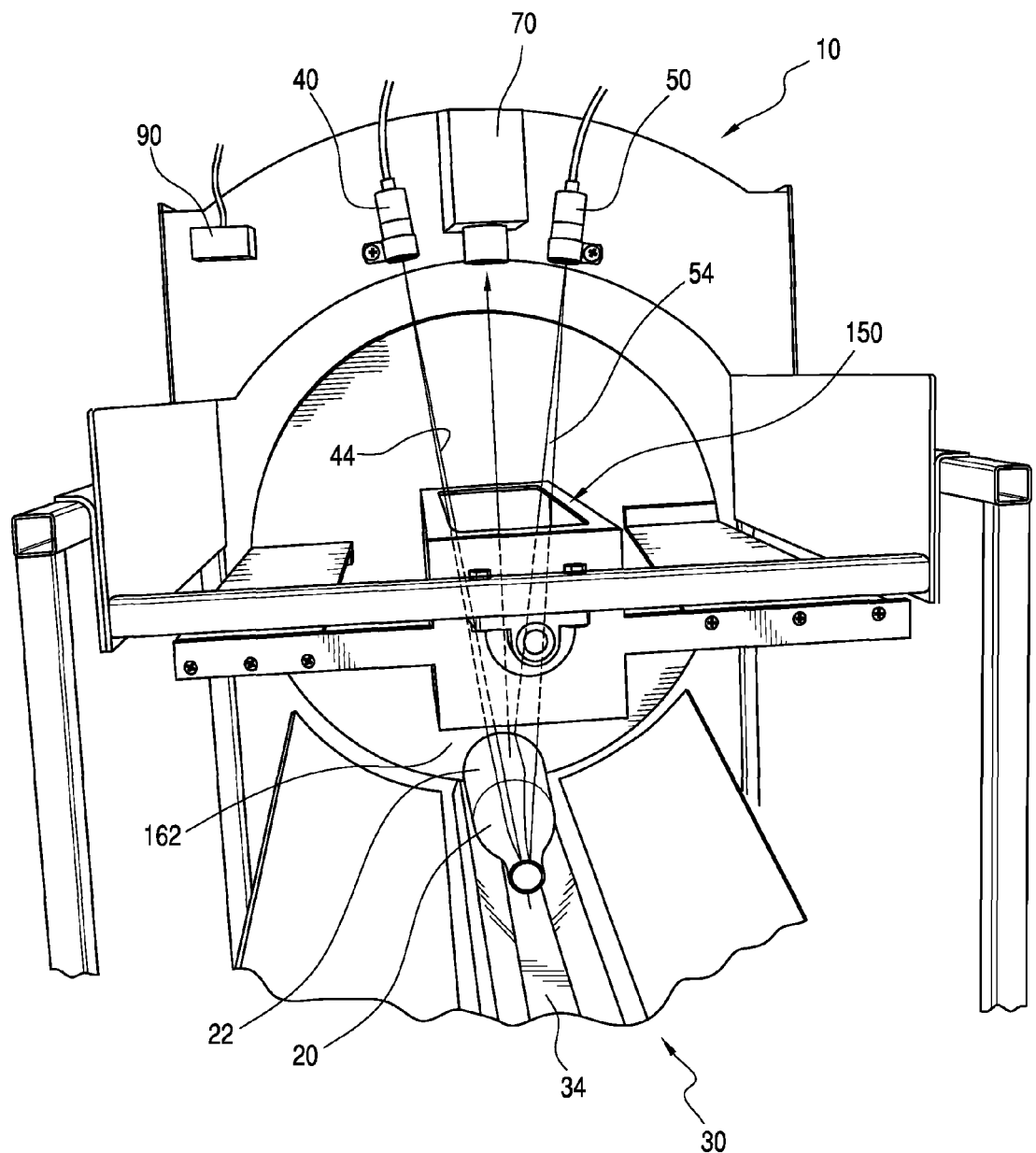
FIG. 1 is a front perspective view of a first embodiment of a device for measuring the length and diameter of a container using structured light according to the invention that has two laser light sources and one camera.
Figure 2:
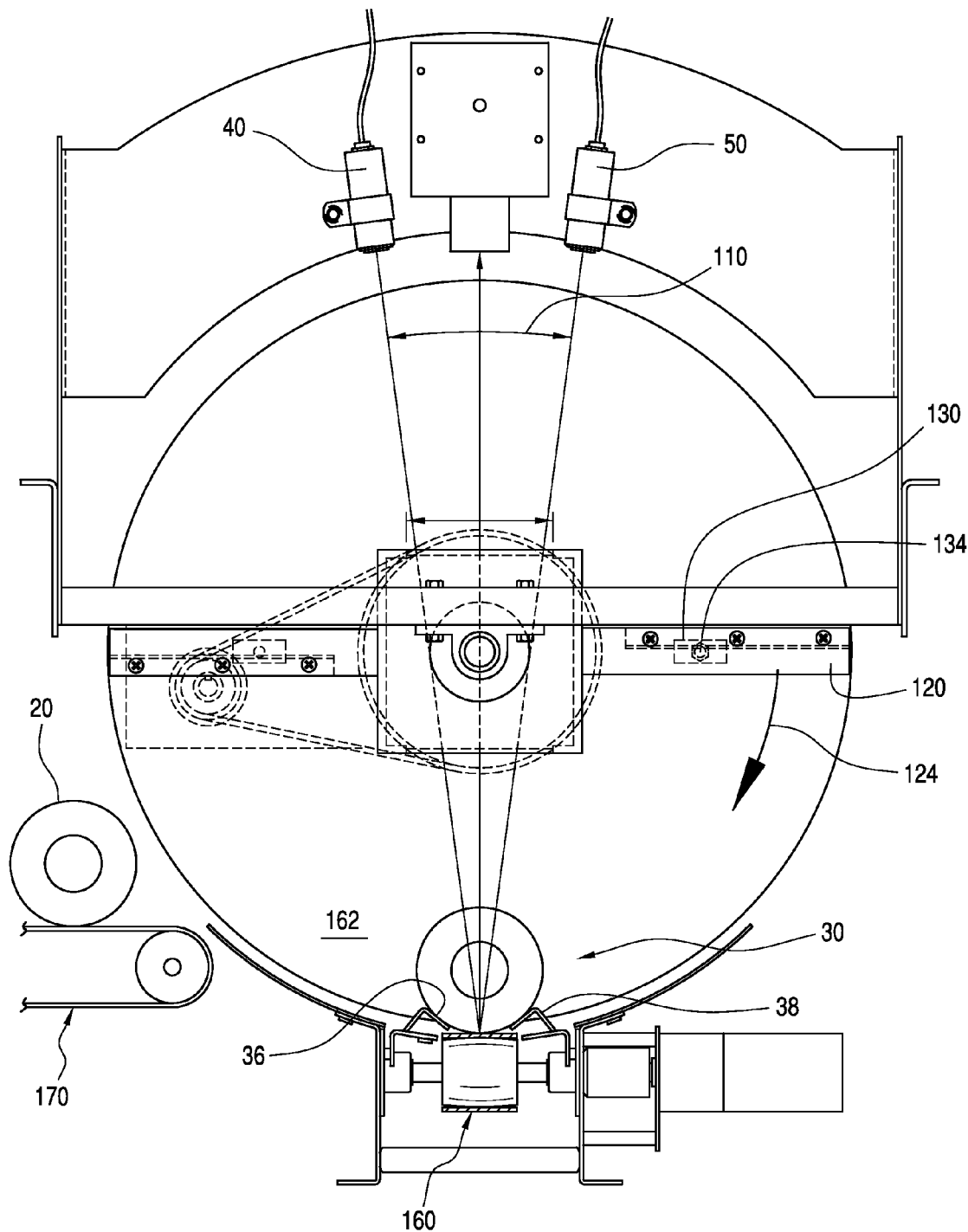
FIG. 2 is a front plan view showing a moved position of the FIG. 1 embodiment.

FIGS. 1-5 show a first embodiment of a device 10 according to the invention for measuring the length and diameter of a container 20 using structured light. Device 10 may include a receiving area 30 for receiving container 20. Receiving area 30 may have a surface 34 on which container 20 is received, as well as a first guide 36 and a second guide 38. The first guide 36 and the second guide 38 may define the substantially V-shaped receiving area 30 stabilizing a cylindrical container 20 received in substantially V-shaped receiving area 30, as seen in FIGS. 1 and 2, for example.

A first laser line generator 40, as well as a second laser line generator 50, may be provided which directs a first triangular plane 44 of laser light, and a second triangular plane 54 of laser light, respectively, at receiving area 30 and container 20 received therein.

Figure 3:
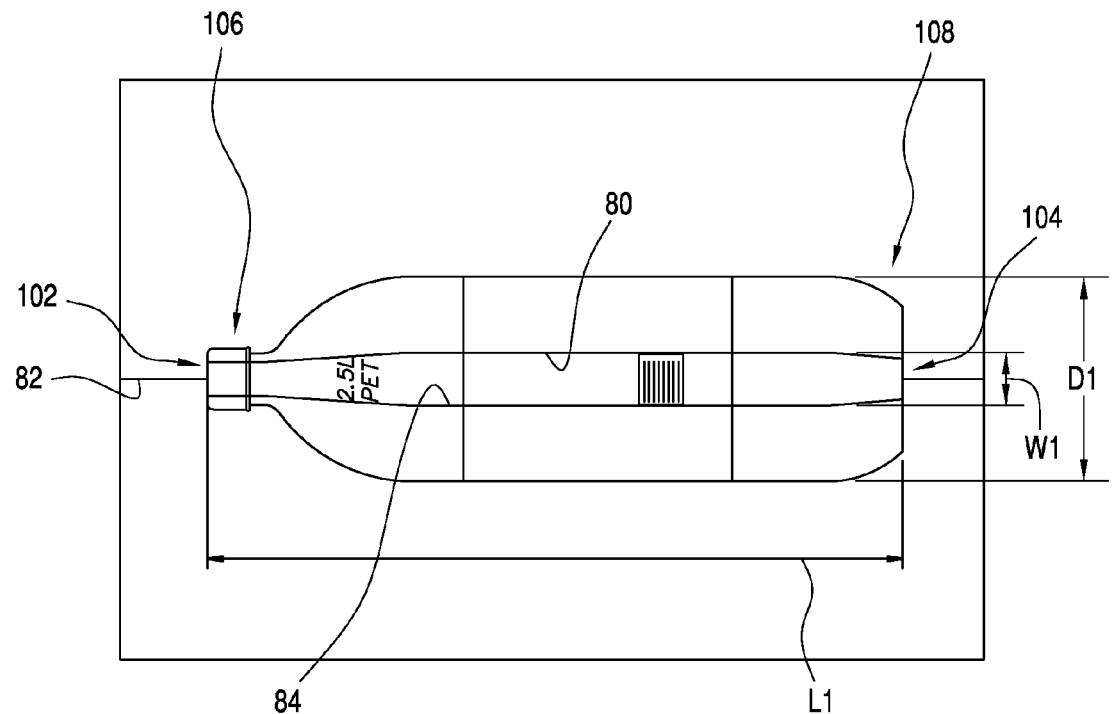
FIG. 3 is a schematic camera image of a container, such as the illustrated 2.5 l container, taken by the embodiment in FIG. 1.
Figure 4:
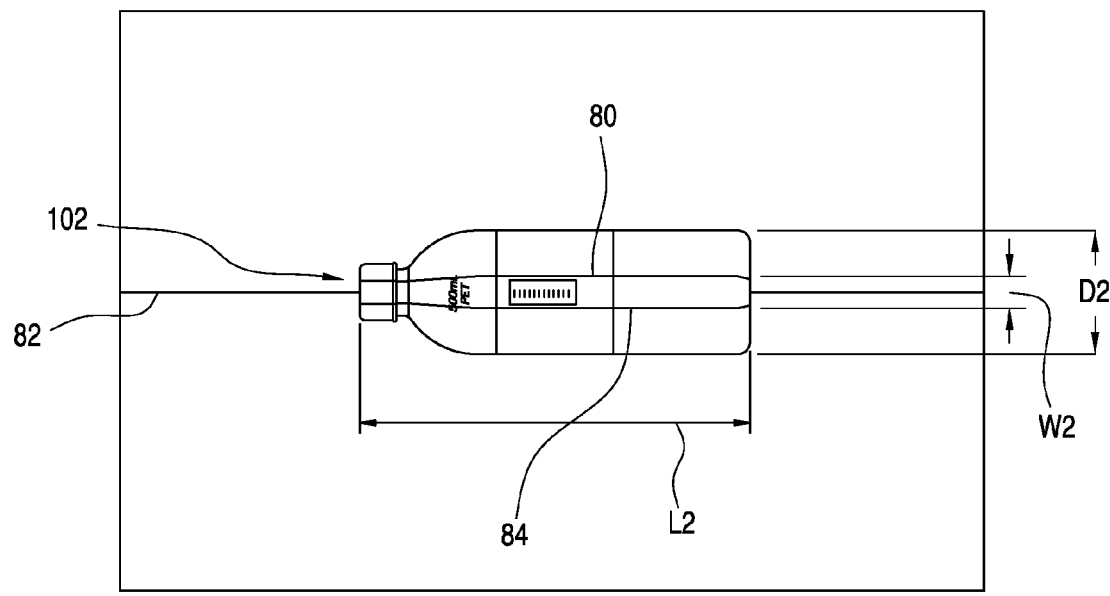
FIG. 4 is a view similar to FIG. 3 of a 500 ml container, taken by the embodiment of FIG. 1.

A camera 70 may be provided which detects an image of a first laser line 80 appearing on a surface of container 20 in receiving area, for detecting an image of a second laser line 82 appearing on surface 34 of the receiving area, and for detecting an image of a third laser line 84 appearing on surface 22 of container 20 in receiving area, as shown in detail in FIGS. 3 and 4. Third laser line 84 is from second triangular plane 54 of laser light, and a fourth laser line which appears on surface 34 is coincident with second laser line 82, as shown, and as the second triangular plane of light 54 is directed; thus the fourth laser line is not separately numbered from second laser line 82.

Analyzing device receives and uses the images of third laser line 84 and the fourth laser line, coincident with second laser line 82, as shown, in addition to the images of first and second laser lines 80, 82 to determine the diameter and length of container 20.

An analyzer 90 or may be provided as part of device 10, as shown, or at a distance in an unillustrated laptop or as a dedicated computer chip as will be appreciated. Analyzer 90 receives the image of the first laser line 80 appearing on container 20, and image of the second laser line 82 appearing on surface 34 of the receiving area on which container 20 rests. Analyzing device 90 uses respective images 80, 82 of first and second laser lines detected by camera 70 to determine a length L1 of container received in receiving area 30. Analyzing device 90 uses images 80, 84 of first and third laser lines 80, 84, respectively, to determine a width W1 between those lines, with which a calculation is made to determine a diameter D1 of that container 20.

Analyzing device 90 determines length L1, width W1, and diameter D1 of a container of unknown size (shown as a 2.5 l container 20 in FIG. 3 for ease of discussion) by detecting and using a first discontinuity 102 between first laser line image 80 (and third laser line image 84) and second laser line image 82, and device determines length L1 of container by determining a distance between first and second discontinuities 102, 104. Device detects first discontinuity 102 at a point where first line 80 is offset at a distance from second line 82 adjacent a first end 106 of container 20, and device detects second discontinuity 104 at a point where first line 80 is offset from second line 82 (and third laser line image 84) adjacent a second end 108 of container 20.

Device 10 may determine length L1 of container by counting number of pixels in first laser line image 80 in distance between first discontinuity 102 and second discontinuity 104.

Analyzing device may determine diameter D1 of container 20 by counting the number of pixels in width W1 between first laser line image 80 and the third laser line image 84; then, given that an angle 110 between first and second triangular planes 44,54 of laser light is known, such as 15°, it is a straightforward calculation to yield diameter D1.

Given those measurements of W1 and L1 described above, analyzing device 90 readily determines actual diameter and length of unknown container 20, which indicate that container 20 is a 2.5 l container.

Likewise, it is contemplated that device 10 and analyzing device 90 be calibrated before use, as described below.

FIG. 4 shows a 500 ml container 20 in which a length L2, and a width W2 are shown, by which a diameter D2 is calculated in an analogous manner as described above with reference to FIG. 3.

With reference to FIGS. 1-2, when measuring device 10 is in use, such as in a reverse vending machine (RVM), measured container 20 may be moved off receiving area 30 so that a new container to be measured may be brought in. FIG. 2 shows movement of paddles or blades 120 which may rotate in a clockwise direction 124, as shown. One or more alignment marks 130 and a corresponding alignment mark detector 134 may be provided to ensure a viewing window 150 is in proper alignment after a measured container has been moved out of receiving area 30 by rotation of paddle 120 for the next container measurement to occur. Surface 34 on which container 20 rests may be an upper surface of a conveyor 160 which brings in container 20 to be measured. Conveyor 160 may advance container 20 until it abuts a stop 162 provided adjacent conveyor 160, as shown, such as wall 162.

After container 20 has been measured, it may be moved out of device 10 and onto an optional further conveyor 170. From there, container may be moved to a shredding area or a further sorting area, depending on the intended use.

It will be readily appreciated by a person having ordinary skill in the art that the determination of the length in millimeters (mm) and determination of the diameter of container may be readily made. That is because, for example, container 20 of unknown size to be measured is measured in a calibrated device 10, calibrated before initial use at the same known distance from camera 70, and angle 110 at which laser light is directed at container is known. Thus, the image received by the camera, and hence analyzing device 90 will be known, given device 10 was calibrated before first use. The length will be determinable as analyzing device 90 will receive the image of the first line 80 on container 20 shown in FIG. 3. First line 80 will have a length, measurable in pixels. Given the distance of the line from the camera image, the pixel count corresponding to that length may be correlated with an actual length. That calibrating can be done by using a calibration container of a known diameter and a known length. Device 10 may be calibrated using actual 2.5 l beverage containers, as well as a known 500 ml container, as shown in FIG. 4, and other known sizes, such as 200 ml and 355 ml. Measurements and pixel counts would thus be made based on known lengths of containers, such as the 500 ml container of FIG. 4. As to the width (e.g., diameter measurements), the distance in pixels between the first line and third line imaged on FIG. 4 would be known and calibrated based again on use of an actual 2.5 l and a 500 ml bottles of FIGS. 3 and 4, respectively, for example.

Figure 5:
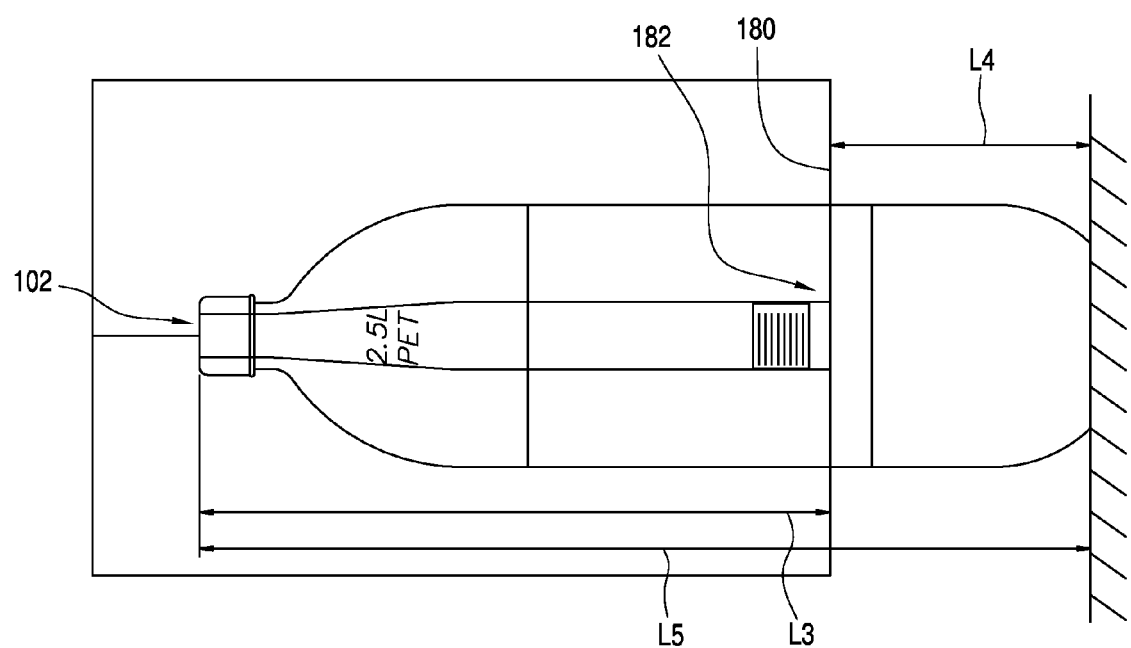
FIG. 5 is a view similar to FIG. 3 of a 2.5 l container taken by the embodiment of FIG. 1, and in which only a portion of the container is imaged, as shown.

FIG. 5 illustrates container 20 being imaged in a manner similar to the views of FIGS. 3 and 4, except that the camera image is of a portion of the container, such as the upper portion of a container extending to the left in FIG. 5. By directing camera 70 at only part of the container, the image size may be increased, resolution of the length measurement may be likewise increased, and errors in length measurement due to parallax may be reduced, as will be understood.

As shown, in such a case, container 20 to be measured may be stopped at a known location. If a conveyor 160 were used, such as shown in FIG. 2, container 20 could be stopped against a stop, such as rear wall 162 at a known distance, a length L4.

Thus, when a length measurement L3 is made by measuring the distance between discontinuity 102 and a discontinuity 182, which occurs at an edge 180 of the camera image of FIG. 5, length L3 will be determined as described above. Then, known length L4 and determined length L3 will be added together to yield an overall container length L5.

Figure 6:
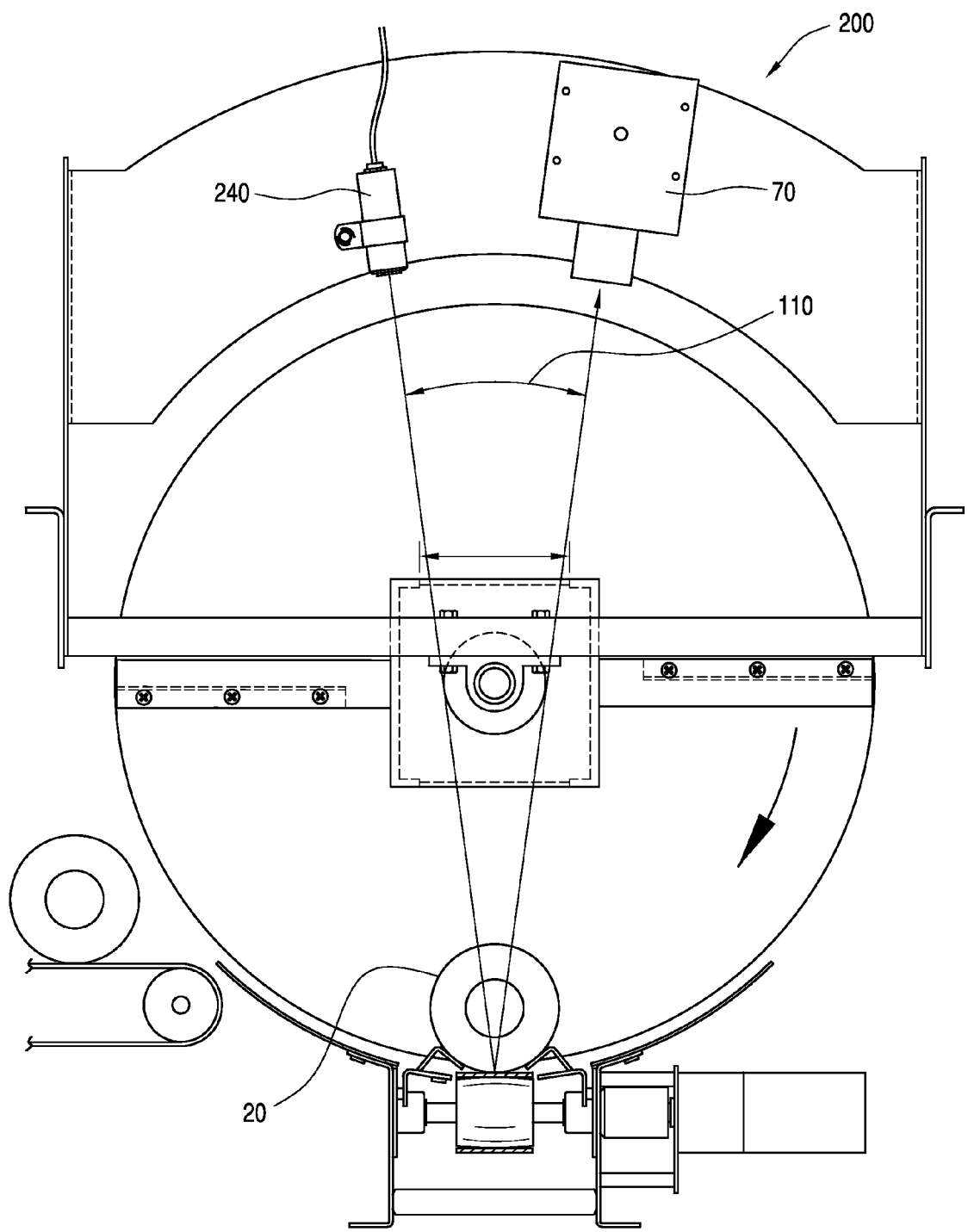
FIG. 6 is a front plan view of a further embodiment of a device for measuring the length and diameter of a container using structured light according to the invention that has one laser light source and one camera.
Figure 7:
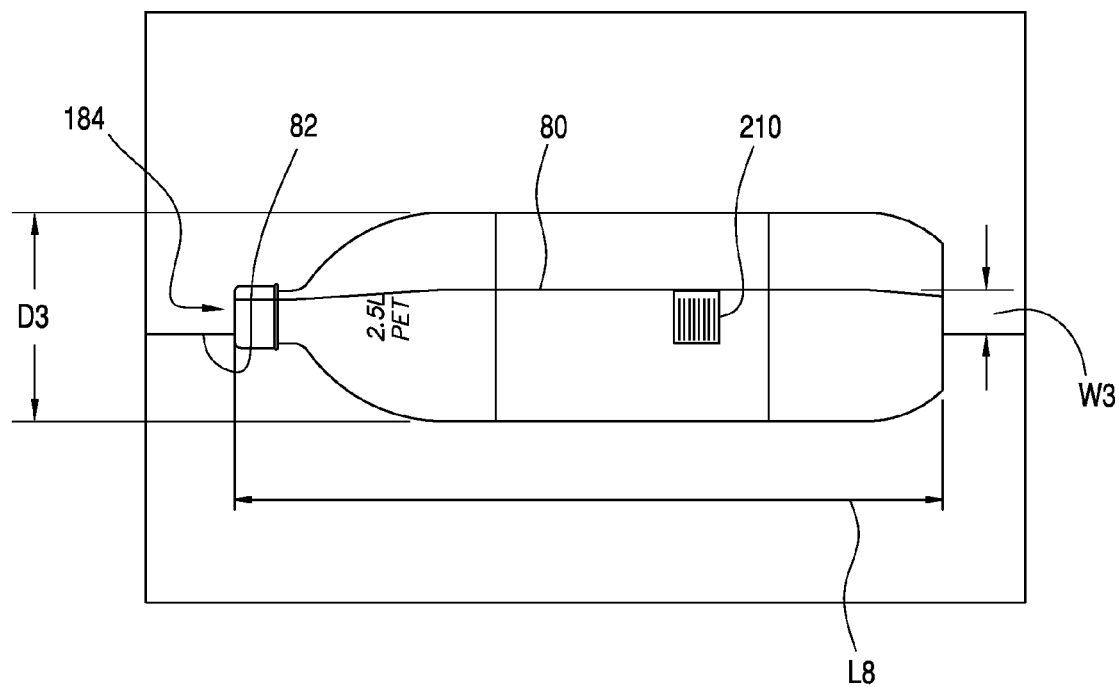
FIG. 7 is a further schematic camera image of a 2.5 l container, taken by the embodiment of FIG. 6.

FIGS. 6 and 7 illustrate a further embodiment of a device 200 according to the invention for measuring the length and diameter of container 20 using structured light. Device 200 uses only one laser line generator 240 and camera 70. An angle 110 between first triangular plane 44 and image returned to camera 70 would be known.

FIG. 7 shows a length L8 of container 20 may be determined analogous to that described above in connection with FIG. 3. At a discontinuity 184, second laser line 82 may be offset from the centerline of the container being measured, as shown, owing to camera 70 being located offset, as shown in FIG. 6, from the location of camera 70 in the FIG. 1 embodiment, in which camera 70 is directly above container. In the FIG. 7 embodiment with one laser line generator 40, camera 70 may be located directly above container 20.

As to diameter D3, it will be appreciated that a width W3 will be determined in an analogous manner to the determination of width W1; however, it will be noted that width W3 corresponds only to the distance or length between first laser line 80 and second laser line 82. For that reason, camera 70 may be located at a greater distance from laser line generator 240 than might be done when there are two laser line generators 40 and 50 as in the embodiment of FIG. 1. In that manner, a better calculation of diameter D3 may be made than if camera 70 were closer to laser line generator 240. As shown, width W3 may be determined at the widest offset between lines 80 and 82. The calculation of the actual diameter D3 may be made in a straightforward manner as described above.

Good results have been achieved when measurements were made using laser line generators and a conventional video graphics display (VGA) having a resolution of 640× 480 pixels. Laser line generator 40, laser line generator 50, and camera 70, were at known distances from receiving area 30, and diameters of respective control bottles of different diameters and lengths were likewise known. Angle 110 between laser line generators 40 and 50 was likewise known.

If it is desired to provide a device having a lower overall height, the illustrated camera and laser line generators of FIGS. 1-2, for example, could be moved closer to receiving area 30, and device 10 would be recalibrated at those new distances by using containers of known sizes, as before.

If device 10 were used in a reverse vending machine (RVM), length L1 and diameter D1 determined for container 20 may be used to compare with the data received by a bar code reader in the RVM that read a bar code 210 on container 20. In that manner it could be determined by analyzing device 90, for example, whether length L1 and diameter D1 agree with the bar code data. Appropriate steps such as rejecting container 20, or processing container 20 based on the correct data could then be taken.

It is contemplated that the inventive measuring device may be used for quality control size determinations.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A device for measuring the length and diameter of a cylindrical container using structured lighting, comprising:
   a) a substantially V-shaped receiving area for receiving a cylindrical container, the cylindrical container having a first end and a second end defining the length of the cylindrical container, and a diameter; the substantially V-shaped receiving area having a surface on which a cylindrical container is received, the V-shaped receiving area including a first guide and a second guide on which the cylindrical container is received; the first guide and the second guide defining the substantially V-shaped receiving area stabilizing a cylindrical container received in the substantially V-shaped receiving area;
   b) a first laser line generator, the first laser line generator directing a first triangular plane of laser light at the substantially V-shaped receiving area and a cylindrical container received in the substantially V-shaped receiving area;
   c) a camera, the camera detecting an image of a first laser line appearing on a surface of the cylindrical container in the substantially V-shaped receiving area, and the camera detecting an image of a second laser line appearing on the surface of the substantially V-shaped receiving area;
   d) an analyzer, the analyzer receiving the image of the first laser line appearing on the cylindrical container, and the analyzer receiving the image of the second laser line appearing on the surface of the substantially V-shaped receiving area on which the cylindrical container rests;
   e) the analyzer using the images of the first and second laser lines detected by the camera to determine the diameter of the cylindrical container received on the substantially V-shaped receiving area; and
   f) the analyzer using the images of the first and second laser lines detected by the camera to determine the length of the cylindrical container received on the substantially V-shaped receiving area.

2. The device as in claim 1, wherein:
   a) the analyzer detects a first discontinuity between the image of the first laser line on the cylindrical container and the image of the second laser line on the surface of the substantially V-shaped receiving area, and the analyzer determines a length of the cylindrical container by determining a distance between the first discontinuity and a second discontinuity.

3. The device as in claim 2, wherein:
   a) the analyzer detects the first discontinuity at a point where the image of the first laser line is offset at a distance from the image of the second laser line adjacent a first end of the cylindrical container; and
   b) the analyzer detects the second discontinuity at a point where the image of the first laser line is offset from the image of the second laser line adjacent a second end of the cylindrical container.

4. The device as in claim 2, wherein:
   a) the analyzer determines the length of the cylindrical container by counting the number of pixels in the image of the first laser line in the distance between the first discontinuity and the second discontinuity.

5. The device as in claim 1, wherein:
   a) the image of the first laser line is offset from the image of the second laser line; and
   b) the analyzer determines the diameter of the cylindrical container by counting the number of pixels in the offset between the image of the first laser line and the image of the second laser line.

6. The device as in claim 1, wherein:
   a) a second laser line generator is provided, and the second laser line generator directs a second triangular plane of laser light at the receiving area and a cylindrical container received in the substantially V-shaped receiving area; and
   b) the camera detects an image of a third laser line which appears on the surface of the cylindrical container in the substantially V-shaped receiving area, and the camera detects an image of a fourth laser line which appears on the surface of the substantially V-shaped receiving area and which is coincident with the second laser line; and
   c) the analyzer receives the image of the third laser line and the image of the fourth laser line and uses the images of the third and fourth laser lines in addition to the images of the first and second laser lines to determine the diameter of the cylindrical container and the length of the cylindrical container.

7. The device as in claim 2, wherein:
a) the first end of the cylindrical container is inside the image received by the camera, and the second end of the container is outside the image received by the camera;
b) the second end of the cylindrical container is at a known distance from an edge of the image received by the camera, and which edge is adjacent the second end of the cylindrical container;
c) the second discontinuity adjacent the second end of the cylindrical container is at the edge of the image adjacent the second end of the cylindrical container; and
d) the length of the cylindrical container is determined by adding the known distance to the distance between the first discontinuity and the second discontinuity.

8. The device as in claim 1, wherein:
a) a conveyor is provided to bring a cylindrical container to the substantially v-shaped receiving area.

9. The device as in claim 8, wherein:
a) the conveyor has an upper surface on which a cylindrical container is brought into the substantially V-shaped receiving area.

10. The device as in claim 8, wherein:
a) the conveyor advances until a cylindrical container received on the conveyor hits a stop.

11. The device as in claim 1, wherein:
a) the analyzer includes a computer chip.

12. The reverse vending machine as in claim 11, wherein:
a) the laser line detected on the cylindrical container and the laser line detected on the substantially V-shaped receiving area are used to determine the diameter of a cylindrical container received in the substantially V-shaped receiving area; and
b) data received by a bar code reader is compared to the length and the diameter of the cylindrical container determined by the analyzer, to determine whether the length and diameter agree with the bar code data.

13. The reverse vending machine as in claim 12, wherein:
a) the conveyor has an upper surface on which a cylindrical container is brought into the substantially V-shaped receiving area.

14. The reverse vending machine as in claim 11, wherein:
a) a conveyor is provided to bring a cylindrical container to the substantially v-shaped receiving area.

15. The device as in claim 14, wherein:
a) a stop is provided adjacent the conveyor, and the conveyor advances until a cylindrical container received on the conveyor hits the stop.

16. A reverse vending machine, comprising;
a) a device for measuring the length and diameter of a cylindrical container using structured lighting, the device including:
i) a substantially V-shaped receiving area for receiving a cylindrical container having a first end and a second end defining the length of the cylindrical container, and a diameter, the substantially V-shaped receiving area having a surface on which a cylindrical container is received, the V-shaped receiving area including a first guide and a second guide on which the cylindrical container is received, the first guide and the second guide defining the substantially V-shaped receiving area stabilizing a cylindrical container received in the substantially V-shaped receiving area;
ii) a first laser line generator, the first laser line generator directing a first triangular plane of laser light at the substantially V-shaped receiving area and a cylindrical container received in the substantially V-shaped receiving area;
iii) a camera, the camera detecting an image of a first laser line appearing on a surface of the cylindrical container in the substantially V-shaped receiving area, and the camera detecting an image of a second laser line appearing on the surface of the substantially V-shaped receiving area;
iv) an analyzer, the analyzer receiving the image of the first laser line appearing on the cylindrical container, and the analyzer receiving the image of the second laser line appearing on the surface of the substantially V-shaped receiving area on which the cylindrical container rests;
v) the analyzer using the images of the first and second laser lines detected by the camera to determine the diameter of the cylindrical container received on the substantially V-shaped receiving area; and
vi) the analyzer using the images of the first and second laser lines detected by the camera to determine the length of the cylindrical container received on the substantially V-shaped receiving area.

* * * * *